United States Patent [19]

Kelly et al.

[11] 4,098,952

[45] Jul. 4, 1978

[54] COATED POLYESTER FILM ASSEMBLY WITH A PRIMER LAYER

[75] Inventors: Roger Sidney Arthur Kelly; John Robert Wilson, both of Knebworth, England

[73] Assignee: Imperial Chemical Industries Limited, Great Britain

[21] Appl. No.: 707,764

[22] Filed: Jul. 22, 1976

[30] Foreign Application Priority Data

Aug. 4, 1975 [GB] United Kingdom ............... 32487/75

[51] Int. Cl.$^2$ .................... B32B 27/06; B32B 27/36
[52] U.S. Cl. .................... 428/483; 428/520; 428/910; 428/508; 428/510; 427/322
[58] Field of Search .............. 428/910, 483, 332, 508, 428/399, 510, 520

[56] References Cited

U.S. PATENT DOCUMENTS

| 3,318,975 | 5/1967 | Deichert et al. ............... 428/483 X |
| 3,819,773 | 6/1974 | Pears .............................. 264/37 |
| 3,841,903 | 10/1974 | Haung et al. ................... 428/483 X |
| 3,922,440 | 11/1975 | Wegwerth et al. ............. 428/483 X |
| 3,940,523 | 2/1976 | Lecoeur et al. ................ 428/483 X |

FOREIGN PATENT DOCUMENTS

| 53,166/64 | 7/1964 | Australia. |
| 1,168,171 | 10/1969 | United Kingdom. |
| 1,146,215 | 3/1969 | United Kingdom. |
| 1,280,884 | 7/1972 | United Kingdom. |
| 1,271,921 | 4/1972 | United Kingdom. |

OTHER PUBLICATIONS

Abstract, Fuji, Japan-7222065-R, 21-6-72, "Magnetic Record, Med. etc".
Abstract, Tokyo, Japan, J74037-584, 7-10-70.
Abstract, Konishiroku, German Appl. 2538550, 11 Mar. 1976, 74 JA 100445, 31 Aug. 1974.

*Primary Examiner*—P. C. Ives
*Attorney, Agent, or Firm*—Cushman, Darby & Cushman

[57] ABSTRACT

Polyester films are primed with copolymers of acrylic or methacrylic acid esters, glycidyl acrylate or methacrylate, and acrylonitrile, optionally with an acrylic or methacrylic comonomer having a functional hydrophilic group, e.g. hydroxyethyl methacrylate. When the priming polymer contains less than 20 mole % of acrylonitrile as comonomer it is preferably cross-linked with an agent such as a melamine formaldehyde condensate.

19 Claims, No Drawings

COATED POLYESTER FILM ASSEMBLY WITH A PRIMER LAYER

This invention relates to coated film assemblies and to processes for their production.

Difficulties are often encountered in providing strong adhesion between support films such as films of linear polyesters, e.g. polyethylene terephthalate, and functional coatings applied to them together with other desirable properties including resistance to attack by solvents.

This invention is concerned with coated film assemblies comprising a priming layer which is present as an intermediate adhesion-promoting layer for functional coatings which may be superimposed upon the priming layer.

According to the present invention, a coated film assembly comprises a support film of a linear polyester and a polymeric priming layer applied to at least one surface of the support film, said priming layer comprising a copolymer comprising:

3 to 25 mole % of glycidyl methacrylate or glycidyl acrylate,
35 to 95 mole % of one or more other copolymerisable monomers selected from the esters of acrylic and methyacrylic acids, and
1 to 60 mole % of acrylonitrile.

According to another aspect of the present invention, a process for the production of a coated film assembly comprises applying a polymeric priming layer to at least one surface of a support film of a linear polyester, said priming layer comprising a copolymer comprising:

3 to 25 mole % of glycidyl methacrylate or glycidyl acrylate,
35 to 95 mole % of one or more other copolymerisable monomers selected from the esters of acrylic and methacrylic acids, and
1 to 60 mole % of acrylonitrile.

The comonomers for the priming copolymer may optionally include small amounts, e.g. up to 3 mole %, of acrylic and/or methacrylic acids and/or up to 15 mole % of an acrylic or methacrylic monomer having a functional hydrophilic group.

The priming copolymer is preferably cross-linked with an added cross-linking agent when the proportion of acrylonitrile in the copolymer is less than 20 mole % provided the proportions of glycidyl methacrylate or glycidyl acrylate and the acrylic or methacrylic monomer having a functional hydrophilic group, when present, are less than 15 mole % and 10 mole % respectively.

The support film may comprise any suitable self-supporting synthetic linear polyester film, such as those films produced from polyesters which may be obtained by condensing one or more dicarboxylic acids or their lower alkyl diesters, e.g. terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxylphenoxy ethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol. Biaxially oriented and heat-set films of polyethylene terephthalate are particularly useful for the production of coated film assemblies according to the invention.

The epoxy group of the glycidyl methacrylate and glycidyl acrylate is effective in cross-linking the priming layer thereby providing barrier properties against the penetration of organic solvents which may be used for the application of functional coatings and might weaken or destroy the bond between the priming layer and the support film. This cross-linking is enhanced by the presence of a hydrophilic acrylic or methacrylic comonomer since its hydrophilic group can cross-link with the epoxy group of the glycidyl methacrylate or glycidyl acrylate to provide the desired barrier properties. The presence of this hydrophilic monomer in the priming copolymer also improves the adhesion of the priming layer to functional hydrophilic coatings applied over the priming layer, e.g. partially hydrolysed polyvinyl acetate, and reduces the tendency of many superimposed coatings, especially cross-linked coatings, to craze when in contact with certain solvents, e.g. acetone.

The acrylic or methacrylic monomer having a functional group preferably comprises a hydroxyl functional group. The preferred monomers are hydroxyalkyl methacrylates, especially hydroxyethyl methacrylate, and silanes which hydrolyse in aqueous media to introduce functional hydroxyl groups, such as γ-methacryloxypropyl trimethoxysilane.

The presence of acrylonitrile as a comonomer in the priming copolymer also confers on the priming copolymer a resistance against solvent penetration and hence also protection against damage to the bond between the priming layer and the support film. The presence of acrylonitrile also improves the adhesion of the priming layer to polar coatings superimposed on the priming layer, e.g. cellulose acetate, because acrylonitrile has a highly polar functional cyanide group and improves the compatibility of the priming copolymer with polar top coatings.

The primary copolymer is formed with one or more monomers selected from the esters of acrylic acid and methacrylic acid. Suitable esters include alkyl esters in which the alkyl group comprises up to 10 carbon atoms, e.g. methyl, ethyl, propyl, isopropyl, butyl, hexyl, heptyl, n-octyl, and 2-ethylhexyl acrylates and methacrylates. Ethyl acrylate and methyl methacrylate are especially useful and may be used in conjunction to produce a priming copolymer having strong adhesion to the support film and superimposed functional coatings.

The preferred effective ranges of the comonomers are 5 to 10 mole % of glycidyl methacrylate or glycidyl acrylate, 1 to 5 mole % of acrylic or methacrylic monomer having a functional group, e.g. hydroxyalkyl methacrylate, up to 40 mole % of acrylonitrile and 50 to 80 mole % of acrylic and/or methacrylic acid ester(s). Higher proportions of the esters of methacrylic acid and acrylonitrile monomers provide harder priming layers which are less susceptible to the action of solvents used for the application of functional coatings and provide weaker adhesion to such coatings whilst higher proportions of the esters of acrylic acid result in softer priming layers which permit solvents to penetrate to the support film/priming layer interface thereby weakening the adhesion of the priming layer to the film. A satisfactory combination of adhesive properties may be obtained when the priming copolymer comprises from 30 to 50 mole % of the esters of acrylic acid and from 40 to 60 mole % of the esters of methacrylic acid plus acrylonitrile. Satisfactory film-forming properties at about or below 40° C may be achieved when the total molar proportion of acrylonitrile and the acrylic and/or methacrylic acid esters is in the range 80 to 95%. Priming copolymers derived from ethyl acrylate or methyl methacrylate or, more preferably, the two monomers together preferably comprise 30 to 50 mole % of ethyl acrylate and 20 to 50 mole % of methyl methacrylate. A typical priming copolymer is formed from 7 mole % of glycidyl methacrylate, 1 mole % of hydroxyethyl methacrylate, 35 mole % of ethyl acrylate, 21 mole % of methyl methacrylate and 36 mole % of acrylonitrile.

The added cross-linking agent, when employed, functions to cross-link with functional groups, such as hydroxyl and epoxy groups, in the priming copolymer. Additionally, the cross-linking agent should preferably be capable of internal cross-linking in order to provide the desired resistance to solvent penetration. Suitable cross-linking components may comprise epoxy resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, e.g. formaldehyde. A useful condensation product is that of melamine with formaldehyde. The condensation product may optionally be alkoxylated. The cross-linking agent may be used in amounts of up to 25% by weight based on the weight of the copolymer in the priming layer, but preferably in amounts of up to 12% by weight in order that the adhesion of superimposed lacquers in a wide range of solvents may be achieved.

A catalyst is also preferably employed to accelerate the internal cross-linking action of the cross-linking agent and also to accelerate its cross-linking action with the cross-linkable functional groups in the priming copolymer. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, and morpholinium para toluene sulphonate.

The copolymeric component of the priming coating composition should preferably be film-forming at temperatures below about 40° C so that the final product after drying and curing is in the form of an integrated coating.

Conventional additives such as anti-blocking additives and anti-static agents may be included in the priming coating composition.

The coating composition for the priming layer may be applied to the surface of the support film as an aqueous latex by any suitable known film coating technique. The coated film should be dried, preferably by heating to a temperature exceeding 70° C and up to a maximum temperature determined by the nature of the plastics film employed. Heating serves to drive off the aqueous medium and also to facilitate the cross-linking reactions.

Depending on the end use of the coated film, the priming layer may have thicknesses in the range 0.01 to 20 microns. The adhesion of the priming layer to the film support generally increases with increased layer thickness up to a thickness in the region of 0.02 micron. It is therefore preferred that the priming layer should have a thickness of at least 0.02 micron.

The copolymers comprising the priming layer of the coated film assemblies according to the present invention exhibit a low propensity to the accumulation of static charges. The extent to which charge accumulation can be avoided is dependent upon the thickness of the priming layer, layers less than 0.05 micron and especially less than 0.03 micron providing the most favourable resistance to charge accumulation. A satisfactory combination of priming layer adhesion to the film support together with a low propensity to charge accumulation is exhibited by both uncross-linked and cross-linked priming layers having thicknesses in the range 0.02 to 0.05 micron.

When the support film is an oriented film, e.g. a biaxially oriented film of polyethylene terephthalate, the coating composition may be applied to the support film before, during or after the stretching process employed to achieve orientation. A convenient procedure is to coat the support film between the two stretching operations which are applied in mutually perpendicular directions to orient the film. If the coating composition is applied to the film after orientation has been completed and after heat setting, when employed, only certain superimposed lacquers will adhere with satisfactory bond strength to the priming layer.

The functional lacquers providing the most satisfactory bond are generally those containing solvents which do not swell the priming layer, e.g. water.

The priming layers provide strong adhesion to a wide range of superimposed layers including polar lacquers, e.g. thermoplastic and thermosetting acrylic lacquers, cellulosic lacquers, such as cellulose acetate, cellulose acetate butyrate and cellulose acetate propionate, and polyvinyl acetate lacquers (0 to 80% hydrolysed) which may if desired be sensitised with light-sensitive diazonium salts.

The invention is further illustrated by the following examples.

In each of Examples 1 to 14 and Comparative Examples a and b the priming composition was prepared as follows:

600 mls of water, 20 g of emulsifier, 2 mls of dimethylaminoethanol, 0.6 ml of lauryl mercaptan to control molecular weight, 10% by weight of the total monomer content and 25% by weight of the total catalyst content were charged to a flask, degassed, stirred and heated at a polymerisation temperature of 60° C under an inert atmosphere. The total volume of the monomers was about 600 mls, and of the catalyst 300 mls of a 0.1% aqueous solution of potassium persulphate. After the reaction had progressed for 30 minutes, the remaining monomers and a further 55% by weight of the catalyst were fed in over a period of about 3 hours. The resulting latex was stirred for a further 15 minutes, the remaining 20% by weight of catalyst added, and the batch was stirred for a further 15 minutes before discharge. The latex was stripped of residual monomers under partial vacuum.

In Examples 1 to 8 and Comparative Examples a and b the emulsifier was 'GAFAC' RE610, in Examples 9 and 10 'NANSA' 1106, and in Examples 11 and 12 'AEROSOL' OT, all being commercially available materials.

In Examples 1 to 13 and Comparative Examples a and b polyethylene terephthalate film was melt extruded and quenched to the amorphous state on a cooled rotating drum. The resulting film was stretched in the direction of extrusion to about 3.5 times its original length. It was then coated on both sides with the aqueous dispersions described in each of the examples by a roller coating technique and passed into a stenter oven where the coating was dried. The dried coated film was then stretched sideways about 3.5 times its original width and finally heat set at a temperature of about 210° C. The final thickness of the coating on each side of the biaxially drawn film was about 0.02 micron, and the total thickness of the coated film was about 25 microns.

EXAMPLE 1

A composition was prepared from a monomer mixture of:

| | |
|---|---|
| ethyl acrylate | 36 mole % |
| methyl methacrylate | 29 mole % |
| glycidyl methacrylate | 8 mole % |
| hydroxyethyl methacrylate | 2 mole % |
| acrylonitrile | 25 mole % |

This composition was diluted to 3.5% by weight solids and 0.5% by volume of a non-ionic surfactant available commercially as 'Lissapol' N was added. The coated film had good adhesion to matted and unmatted cellulose acetate propionate, cellulose acetate butyrate, hydrolysed polyvinyl acetate and cross-linked acrylic lacquers (available commercially from Rohm Haas as AT50) which had good acetone rub resistance and also good adhesion to cellulose acetate lacquers. The addition of 0.4% by volume of a water-soluble melamine formaldehyde resin available commercially as 'Beetle' BE336 gave no discernable improvement in the adhesion of any lacquer. Both priming layers exhibited a low propensity to static charge accumulation.

EXAMPLES 2 TO 12 AND COMPARATIVE EXAMPLES a AND b

The monomer compositions used in these examples and the adhesion results are summarised in the following Table.

The monomers employed were:

EA — ethyl acrylate
MMA — methyl methacrylate
GMA — glycidyl methacrylate
HEMA — hydroxyethyl methacrylate
ACN — acrylonitrile The cross-linking agent employed in Example 2, 10 and 12 was:

B — a water-soluble melamine formaldehyde resin (available commercially as 'Beetle' BE336)

The adhesion to lacquers applied over the priming layer was assessed with the following lacquers:

CAPr — cellulose acetate propionate
CAB — cellulose acetate butyrate
PVAc — polyvinyl acetate
Ac — cross-linked acrylic resin (available commercially from Rohm Haas as AT50)
CA — cellulose acetate The lacquer adhesion is quoted in Table 1 on a numerical scale in which 1 represents excellent adhesion and 6 represents very bad adhesion.

The solvent resistance of a cross-linked acrylic resin to acetone (rub and craze) was also assessed on a numerical scale in which 1 represents excellent resistance and 6 represents very bad resistance.

The priming layers of Examples 2 to 12 exhibited a low propensity to static charge accumulation.

TABLE 1

| Example No. | Monomers mole % | | | | | Cross-linking agent | | Lacquer adhesion | | | | | Solvent resistance | |
|---|---|---|---|---|---|---|---|---|---|---|---|---|---|---|
| | EA | MMA | GMA | HEMA | ACN | Type | % by volume | CAPr | CAB | PVAc | Ac | CA | Rub | Craze |
| 2 | 38 | 39 | 8 | 2 | 13 | B | 0.4 | 2 | 1 | — | 2 | 4 | 3 | 2 |
| 3 | 35 | 21 | 7 | 1 | 36 | — | — | 1 | 1 | 1 | 1 | 1 | 1 | 1 |
| 4 | 27 | 14 | 7 | 1 | 51 | — | — | 3 | 3 | — | 3 | 3 | 3 | 3 |
| 5 | 37 | 30 | 8 | — | 25 | — | — | 2 | 1 | — | 1 | 3 | 2 | 2 |
| 6 | — | 56 | 7 | 1 | 36 | — | — | 1 | 2 | — | 1 | 6 | 2 | 1 |
| 7 | 35 | 11 | 7 | 1 | 46 | — | — | 4 | 1 | — | 4 | 2 | 2 | 1 |
| 8 | 55 | 21 | 7 | 1 | 16 | — | — | 3 | 1 | — | 5 | 6 | 3 | 1 |
| 9 | 55 | 21 | 7 | 1 | 16 | — | — | 3 | 3 | — | — | — | — | — |
| 10 | 55 | 21 | 7 | 1 | 16 | B | 0.4 | 2 | 1 | — | — | — | — | — |
| 11 | 55 | 21 | 7 | 1 | 16 | — | — | 3 | 3 | — | — | — | — | — |
| 12 | 55 | 21 | 7 | 1 | 16 | B | 0.4 | 2 | 1 | — | — | — | — | — |
| a | 39 | 32 | — | 2 | 27 | — | — | 5 | 6 | — | 4 | 6 | 1 | 1 |
| b | 40 | 32 | — | — | 28 | — | — | 6 | 6 | — | 4 | 5 | 2 | 3 |

EXAMPLE 13

Example 3 was repeated to coat polyethylene terephthalate films with priming layers having the composition of Example 3 at six different coating thicknesses.

Tapes, 1 cm wide, were cut from each primed film and rinsed in isopropanol to remove any accumulated charges. The propensity to charge accumulation was assessed for each tape by draping the tape over a static horizontally mounted chromium plated peg and lowering and raising the tape held under tension by a weight through a Faraday cylinder, 5 cm in depth. The voltage in the cylinder on the ninth pass of each tape over the peg was recorded, and the charge density upon the tape calculated. The variation in propensity to charging in relation to the priming layer thickness is indicated in Table 2.

TABLE 2

| Priming layer thickness microns | charges density pico Coulombs/cm$^2$ all charge positive in polarity |
|---|---|
| 0.014 | 120 |
| 0.018 | 320 |
| 0.024 | 450 |
| 0.034 | 950 |
| 0.044 | 1050 |

TABLE 2-continued

| Priming layer thickness microns | charges density pico Coulombs/cm² all charge positive in polarity |
|---|---|
| 0.058 | 1400 |

EXAMPLE 14

A polyethylene terephthalate film was extruded, stretched and heat set by the procedure described in relation to Examples 1 to 12 and Comparative Examples a and b with the exception that no priming coating was applied between the two stretching steps. In this example the priming latex described in Example 1 was applied to both sides of the film after stretching and heat setting had been completed to provide coating thicknesses of about 1 micron.

The primed film exhibited no adhesion to matted and unmatted cellulose acetate propionate, cellulose acetate butyrate and hydrolysed polyvinyl acetate lacquers in typical organic solution including aromatic hydrocarbon, ketone, ester or alcohol mixtures, but gave good adhesion to many water based lacquers, e.g. an aqueous suspension of 20% of an ethyl acrylate/methyl methacrylate/methacrylamide copolymer, 3% with a methoxylated melamine formaldehyde and containing 35% of a diatomaceous silica filler.

The priming layer exhibited a low propensity to static charge accumulation.

We claim:

1. A coated film assembly, which comprises a support film of a linear polyester and a polymeric priming layer applied to at least one surface of the support film, said priming layer consisting essentially of a copolymer comprising:
   3 to 25 mole % of glycidyl methacrylate or glycidyl acrylate,
   35 to 95 mole % of one or more other copolymerisable monomers selected from the esters of acrylic and methacrylic acids, and
   1 to 60 mole % of acrylonitrile.

2. A coated film assembly according to claim 1, in which the copolymer included in the priming layer also comprises up to 3 mole % of acrylic and/or methacrylic acid.

3. A coated film assembly according to claim 1, in which the monomer selected from the esters of acrylic and methacrylic acids comprises ethyl acrylate and methyl methacrylate.

4. A coated film assembly according to claim 1, in which the copolymer included in the priming layer comprises 50 to 80% of the acrylic and/or methacrylic acid ester(s).

5. A coated film assembly according to claim 1, in which the copolymer included in the priming layer also comprises up to 15 mole % of an acrylic or methacrylic monomer having a functional hydrophilic group.

6. A coated film assembly according to claim 5, in which the acrylic or methacrylic monomer having a functional hydrophilic group comprises hydroxyethyl methacrylate.

7. A coated film assembly according to claim 5, in which the copolymer included in the priming layer comprises 1 to 5 mole % of the acrylic or methacrylic monomer having the functional group.

8. A coated film assembly according to claim 1, in which the copolymer included in the priming layer comprises 5 to 10 mole % of glycidyl methacrylate or glycidyl acrylate.

9. A coated film assembly according to claim 4, in which the copolymer included in the priming layer comprises 30 to 50 mole % of ethyl acrylate and 20 to 50 mole % of methyl methacrylate.

10. A coated film assembly according to claim 1, in which the copolymer included in the priming layer comprises up to 40 mole % of acrylonitrile.

11. A coated film assembly according to claim 1, in which the copolymer included in the priming layer comprises 7 mole % glycidyl methacrylate, 1 mole % of hydroxyethyl methacrylate, 35 mole % of ethyl acrylate, 21 mole % of methyl methacrylate and 36 mole % of acrylonitrile.

12. A coated film assembly according to claim 1, in which the support film comprises a biaxially oriented and heat-set film of polyethylene terephthalate.

13. A coated film assembly according to claim 1, in which the priming layer is further coated with a layer comprising a lacquer comprising a thermoplastic or thermosetting acrylic, cellulose acetate butyrate, cellulose acetate propionate or a polyvinyl acetate (0 to 80% hydrolysed) or cellulose acetate.

14. A coated film assembly according to claim 1, in which the proportion of acrylonitrile in the copolymer of the priming layer is less than 20 mole % and the proportions of glycidyl methacrylate or glycidyl acrylate and the acrylic or methacrylic monomer having a functional hydrophilic group are less than 15 mole % and 10 mole % respectively and the copolymer is cross-linked with an added cross-linking agent.

15. A coated film assembly according to claim 4, in which the copolymer included in the priming layer comprises from 30 to 50 mole % of the esters of acrylic acid and from 40 to 60 mole % of the esters of methacrylic acid plus acrylonitrile.

16. A coated film assembly according to claim 4, in which the copolymer included in the priming layer comprises a total molar proportion of acrylonitrile and the acrylic and/or methacrylic acid esters in the range 80 to 95%.

17. A process for the production of a coated film assembly, which comprises applying a polymeric priming layer to at least one surface of a support film of a linear polyester, said priming layer comprising a copolymer comprising:
   3 to 25 mole % of glycidyl methacrylate or glycidyl acrylate,
   35 to 95 mole % of one or more other copolymerisable monomers selected from the esters of acrylic and methacrylic acids, and
   1 to 60 mole % of acrylonitrile.

18. A process for the production of a coated film assembly, which comprises applying a polymeric priming layer to at least one surface of a support film of a linear polyester, wherein the priming layer comprises a copolymer as specified in claim 1.

19. A process according to claim 17, in which the priming layer is applied to the surface of the support film between the two stretching operations which are applied in mutually perpendicular directions to orient the film.

* * * * *